(12) United States Patent
Klippel et al.

(10) Patent No.: US 6,428,669 B2
(45) Date of Patent: Aug. 6, 2002

(54) METHOD FOR SEPARATING THE CONSTITUENTS OF A DISPERSION

(75) Inventors: Norbert Klippel, Nussbaumen (CH); Ole-Morten Midtgard, Sandvika (NO)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 09/739,702

(22) Filed: Dec. 20, 2000

(30) Foreign Application Priority Data

Dec. 27, 1999 (DE) .......................................... 199 63 351

(51) Int. Cl.$^7$ .............................................. B01D 17/06
(52) U.S. Cl. ........................ 204/555; 204/564; 204/565; 204/573
(58) Field of Search ................................ 204/555, 564, 204/565, 573

(56) References Cited

U.S. PATENT DOCUMENTS

| 4,601,834 A | 7/1986 | Bailes et al. |
| 4,988,427 A | 1/1991 | Wright |

FOREIGN PATENT DOCUMENTS

| EP | 0051463 B1 | 5/1982 |
| GB | 1 582 040 | 12/1980 |

OTHER PUBLICATIONS

"Pulsed DC fields for electrostatic coalescence of water-in-oil emulsions", Bailes, et al., The Chemical Engineer, Oct. 23, 1997, pp. 34–39.
"Liquid Phase Separation in Pulsed D.C. Fields", Bailes, et al., Trans IChemE, vol. 60, 1982, pp. 115–121. No month.
"An Experimental Investigation into the Use of High Voltage D.C. Fields for Liquid Phase Separation", Bailes, et al., Trans IChemE, vol. 59, 1981, pp. 229–237. No month.

*Primary Examiner*—Arun S. Phasge
(74) *Attorney, Agent, or Firm*—Burns, Doane, Swecker & Mathis, L.L.P.

(57) ABSTRACT

In order to improve the efficiency of the separation of an insulating liquid from a dispersum, in particular of water dispersed in oil, the electric conductivity of a dispersion having the dispersion constituents is measured continuously or discontinuously. An optimum frequency is calculated as a function of this conductivity. Pulsations of at least one pulsating electric field are thereby prescribed, this dispersion being led through said field. This frequency is preferably in the frequency range of >60 Hz–1 kHz. An electric field with a separating AC voltage can be arranged downstream of an electric field of a pulsating separating voltage of adjustable frequency in the flow direction of the dispersion, and an electric field of a pulsating charging DC voltage can be arranged upstream.

9 Claims, 1 Drawing Sheet

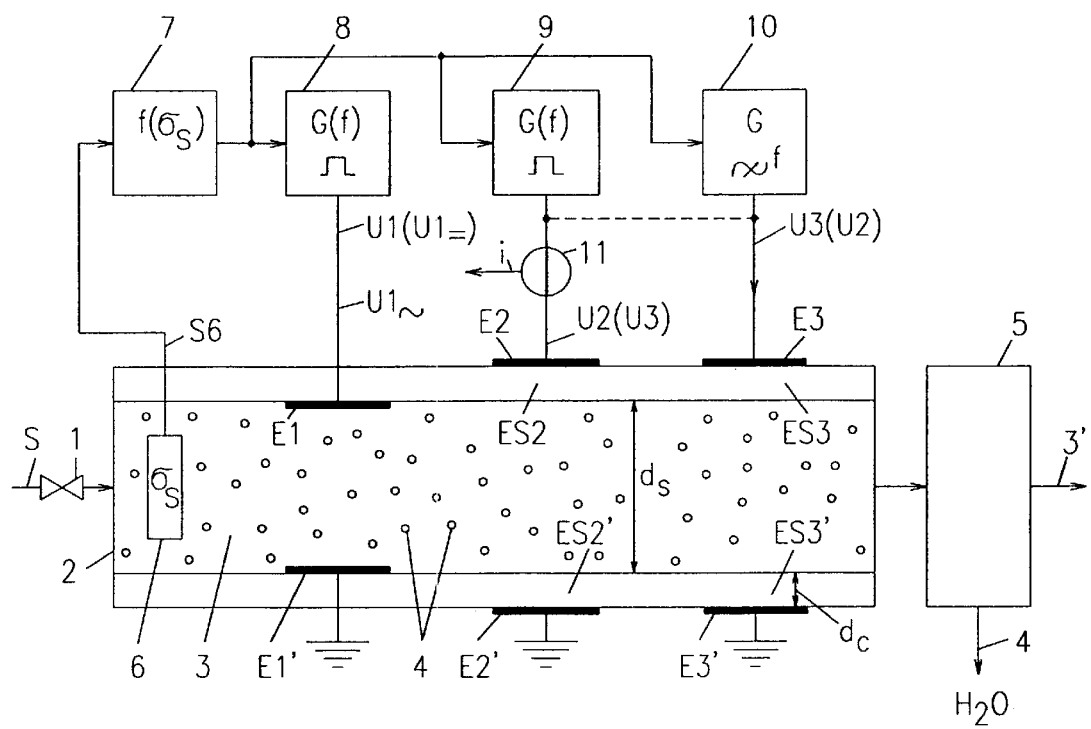

METHOD FOR SEPARATING THE CONSTITUENTS OF A DISPERSION

This application claims priority under 35 U.S.C. §§ 119 and/or 365 to Appln. No. 199 63 351.7 filed in Germany on Dec. 27, 1999; the entire content of which is hereby incorporated by reference.

FIELD OF THE INVENTION

The invention proceeds from a method for separating the constituents of a dispersion having an electrically conducting dispersum dispersed in an insulating liquid, the dispersion being led through at least one pulsating electrical field and the dispersum being subsequently separated from the insulating liquid.

BACKGROUND OF THE INVENTION

The publication by P. J. Bailes and S. K. L. Larkai, "AN EXPERIMENTAL INVESTIGATION INTO THE USE OF HIGH VOLTAGE D.C. FIELDS FOR LIQUID PHASE SEPARATION" in: Trans IChemE, Vol. 59, 1981, pages 229–235, describes that in order to separate the constituents of a dispersion such as, for example, water from oil, a pulsating DC voltage with a frequency in the frequency range of 1 Hz–60 Hz is more effective than a constant one, the shape of the pulses having only a slight influence. Inter alia, the mean current intensity and the maximum voltage gradient were measured continuously over the dispersion. The high-voltage electrode was insulated using Plexiglas, thinner layer thicknesses (3 mm) yielding a larger field gradient in the dispersion than thicker ones (up to 13 mm) for the same applied voltage.

It is known from EP 0 051 463 B1 to guide a dispersion of an electrically conducting liquid in an insulating liquid, for example of water in oil, on a flow path past electrodes with a pulsating DC voltage of $\leq 15$ kV and with a frequency in the range of 1 Hz–60 Hz, preferably in the range of 2 Hz–15 Hz. The low-voltage electrode was preferably not electrically insulated from the dispersion, while the high-voltage electrode was electrically insulated by means of Plexiglas. The maximum field strength between the electrodes on the flow path was under 1100 V/cm, preferably under 100 V/cm. The volume of the electrically conducting liquid had a proportion of >40%, preferably of 50%, of the total volume of the dispersion. After being led through the electrostatic field, the constituents of the dispersion settled in a settling tank, after which they were separated. A functional relationship is specified between the optimum frequency of the pulsating DC voltage to be applied and the thickness of the insulating layer of the high-voltage electrode.

A formula for determining the optimum frequency of the pulsating DC voltage as a function of the dielectric constant, conductivity and thickness of the insulating layers on the electrodes is specified in the publication by P. J. Bailes and S. K. L. Larkai: "LIQUID PHASE SEPARATION IN PULSED D.C. FIELDS", Trans IChemE, Vol. 60, 1982, pages 115–121. Use was made in this reference of pulsating DC voltages in the region of 0.2 kV–10 kV with frequencies in the region of 0.5 Hz–60 Hz.

SUMMARY OF THE INVENTION

The invention achieves the object of further developing a method for separating the constituents of a dispersion of the type mentioned at the beginning so as to render more effective separation possible. In an exemplary method for separating the constituents of a dispersion having an electrically conducting dispersum which is dispersed in an insulating liquid, the dispersion being led through at least one pulsating electric field and the dispersum subsequently being separated from the insulating liquid, the electric conductivity $\sigma_s$ of this dispersion is measured continuously or discontinuously, and the frequency (f) of the pulsations of the electric field is controlled as a function of the measured conductivity $\sigma_s$ of the dispersion.

In an exemplary method, the frequency (f) of the pulsations of the electric field deviates by no more than –50% and +100% from a calculated frequency value $f_x = 1/(2 \cdot \pi \cdot \tau)$ where:

$$\tau = \epsilon_0 \cdot (d_s \cdot \epsilon_c + d_c \cdot \epsilon_s)/(d_s \cdot \sigma_c + d_c \cdot \sigma_s)$$

$c$ = insulating layer ($ES2$, $ES2'$, $ES3$, $ES3'$) of electrodes ($E2$, $E2'$; $E3$, $E3'$) for applying the pulsating electric field, $d_c$ = thickness of an insulating layer of $c$, $d_s$ = thickness of $S$ between these insulating layers ($ES2$, $ES2'$; $ES3$, $ES3'$)

$\sigma_c, \sigma_s$ = electric conductivity of $c$ and $S$, respectively, $\epsilon_c, \epsilon_s$ = dielectric constant of $c$ and $S$, respectively, $\epsilon_0$ = dielectric constant of the vacuum.

Preferably, the frequency (f) of the pulsations deviates by no more than ±20% from the calculated frequency value $f_x$.

In an additional exemplary embodiment, the pulsating electric field is a field of a bipolar electric AC voltage.

In further exemplary embodiments, the dispersion is led through two pulsating electric fields, which follow one another in their flow direction. One of the two electric fields is an electric field of a pulsating DC voltage, and the other is an electric field of an AC voltage.

In yet additional exemplary embodiments, the electrically conducting droplets in the insulating liquid are electrically charged in an electric field of a charging of up to 5 kV before they are exposed to the at least one pulsating electric field of a pulsating separating voltage for the purpose of separating the constituents of the dispersion.

In a still further exemplary embodiment, the proportion of the dispersum in the dispersion is $\leq 40\%$.

In another exemplary embodiments, the insulating liquid is oil.

In still another exemplary embodiment, the frequency (f) of the pulsations of the at least one pulsating electric field is in the frequency range of >60 Hz–1 kHz.

One advantage of the invention consists in that particularly cost-effective and operationally reliable production becomes possible. Owing to the running measurement of the electric conductivity, the pulsation frequency of the electric field can be controlled at any time so as to achieve optimum separation of the dispersion constituents. Fluctuations in the conductivity of the dispersion are thereby detected in good time before poor separation on the basis of a nonoptimum pulsation frequency occurs. Consequently, it is possible to ensure continuous, optimum separation even when the nature of the initial dispersion fluctuates. It is possible as a result, for example, for the process of producing crude oil from an oil-saltwater mixture to be adapted to fluctuations in the initial water content.

An advantageous adaptation of the frequency is not limited solely to a pulsating DC voltage field. It can also be carried out for a coagulator which is operated with an AC voltage. Thus, a conventional coagulator, which is designed for operation with a 50 Hz or 60 Hz line frequency can be retrofitted by installing a conductivity measuring cell and a frequency converter so as to produce an improved separation result.

The combination of serially connected coagulator units renders it possible to optimize separately the electric charging of the water droplets and their movement in the electric field. The charging can be optimized by a stage with the highest possible charge transfer in conjunction with relatively high currents. The external electric field is then decisive, in turn, for the movement of the droplets thus charged. Said field can be kept very strong in a second stage by applying a high AC voltage via insulated electrodes, without the flow of an appreciable active current.

BRIEF DESCRIPTION OF THE DRAWINGS

A preferred embodiment of the invention is disclosed in the following description and illustrated in the accompanying drawing, in which:

FIG. 1 shows a schematic of a separation system for carrying out the separating method.

DETAILED DESCRIPTION OF THE INVENTION

A suspension or dispersion (S) having an electrically conducting dispersum (4), preferably water or $H_2O$ which is suspended or dispersed in an insulating liquid (3), preferably oil, in the form of droplets, is fed into a separating vessel or coagulation vessel (2) via a valve (1). In this case, the proportion of the dispersum (4) in the dispersion (S) is preferably $\leq 40\%$. Provided on the inlet side in the coagulation vessel (2) is a detector for the electric conductivity $\sigma_s$ of the dispersion (S), that is to say a conductivity detector (6) which on the outlet side feeds a measuring signal (S6) proportional to the electric conductivity $\sigma_s$ of the dispersion (S) to a frequency generator or to a frequency control device (7). On the outlet side, this frequency control device (7) supplies a frequency signal (f) with a frequency (f) which is optimum for the separation of the dispersion constituents: insulating liquid (3) and dispersum (4), for a pulsating charging DC voltage (U1) to a pulse generator (8), for a pulsating separating voltage (U2) to a pulse generator (9), and for a separating AC voltage (U3) to a sine-wave generator (10), with an adjustable frequency in each case. The pulse generators (8, 9) are DC power packs whose high voltage is periodically switched on and off on the primary or secondary sides.

An electrode pair (E1, E1') is arranged in the coagulation vessel (2). Following one behind another in the flow direction of the dispersion (S) are electrode pairs (E2, E2'; E3, E3') which are arranged outside on the electrically insulating coagulation vessel (2). The electrodes (E1, E2, E3) are live, and the electrodes (E1', E2', E3') are grounded. Whereas charging electrodes (E1, E1') on the inlet side can remain uncoated because of the relatively low pulsating charging DC voltage (U1), because of the relatively high separating voltages (U2, U3) the downstream separating electrodes (E2, E2') and (E3, E3') are respectively coated or covered with an insulating layer (ES2, ES2') and (ES3, ES3'), respectively, with an insulating layer thickness $d_c$ in the region of 3 mm–10 mm. In the exemplary embodiment illustrated, this insulating layer thickness ($d_c$) is equal to the thickness of the electrode-side wall of the coagulation vessel (2). The index c relates in this case to the respective insulating layer (ES2, ES2'; ES3, ES3'). $d_s$ denotes the thickness of the dispersion (S) between the insulating layers (ES2, ES2') or between (ES3, ES3'), that is to say the spacing of the respective insulating layers of an electrode pair, which is in the region of 1 cm–10 cm.

The charging electrode (E1) receives from the pulse generator (8) the pulsating charging DC voltage (U1) with a voltage amplitude in the region of 500 V–5 kV. Alternatively, a charging DC voltage (U1_) or a charging AC voltage (U1) of the same amplitude as (U1) can be used for the electric charging of the water droplets (4) in the insulating liquid (3).

The separating electrode (E2) receives from the pulse generator (9) the pulsating separating voltage (U2) with a voltage amplitude in the region of 5 kV–30 kV. Alternatively, the separating AC voltage (U3) can, as indicated by dashes, be applied to the separating electrode (E2). It would also be possible for the pulsating separating voltage (U2) to be applied, instead of the separating AC voltage (U3), to the rearmost separating electrode (E3) in the flow direction of the dispersion (S), the separating AC voltage (U3) being applied (not illustrated) to the separating electrode (E2) fitted upstream in the flow direction.

The electric charge transferred to the separating electrode (E2) is detected via an integral measurement of the electric current (i), and transmitted by a data converter (11) as an optical signal into a computer-controlled evaluation device (not illustrated).

The frequency (f) at the output of the frequency control device (7) should deviate by no more than −50% and +100%, preferably by no more than ±20%, from a calculated optimum frequency value $f_x = 1/(2 \cdot \pi \cdot \tau)$, where $$\tau = \epsilon_0 \cdot (d_s \cdot \epsilon_c + d_c \cdot \epsilon_s)/(d_s \cdot \sigma_c + d_c \cdot \sigma_s),$$

$$= \text{relaxation time of } c,$$

$$\sigma_c = \text{electric conductivity of } c,$$

$$\epsilon_c = \text{dielectric constant of } c,$$

$$\epsilon_s = \text{dielectric constant of } S, \text{ and}$$

$$\epsilon_0 = \text{dielectric constant of the vacuum.}$$

This frequency (f) is preferably in the frequency region of >60 Hz–1 kHz.

The rearmost separating electrode (E3) on the flow side receives its separating AC voltage (U3) from the sine-wave generator (10) or from a high-voltage transformer (not illustrated) which is directly connected to the system frequency.

Whereas the pulsating electric field between the 2nd electrode pair (E2, E2') chiefly ensures a high charging of the water droplets (4) in the dispersion (S), the electric field between the 3rd electrode pair (E3, E3') chiefly ensures their migration in the bipolar field. Using this 2-stage separating method, that is to say in the event of a missing 1st electrode pair (E1, E1'), a higher efficiency is achieved in the separation of the constituents (3, 4) of the dispersion (S) than in the case of a 1-stage separating method having only the 2nd electrode pair (E2, E2').

With the aid of the 1st electrode pair (E1, E1'), which is arranged on the flow side upstream of the 2nd electrode pair (E2, E2') and is operated with the aid of a low electric charging DC voltage (U1) in a region of 500 V–5 kV with a relatively high current, an additional improvement is obtained in the electric charging of the water droplets (4), and thus a substantial increase is obtained in the efficiency of the separating method. In this case, the electric field strength between the 2nd electrode pair (E2, E2') is higher, and the current (i) to the 2nd electrode pair (E2, E2') is kept lower than at the 1st electrode pair (E1, E1'), in order to effect a strong movement of the electrically charged water droplets (4) toward the electrode (E2). The 3rd electrode pair (E3, E3') can additionally be provided and effect a further improvement in the efficiency of the separating method.

On the outlet side, the coagulation vessel (2) is connected to a settling vessel (5) from which a separated insulating liquid (3') and the dispersum (4) can be discharged separately.

It goes without saying that the electrodes (E1, E2, E3) need not be grounded. The grounding could also be carried out inversely (with reference to the illustration). The polarity of the pulsating separating voltage (U2) can be freely selected.

LIST OF REFERENCE SYMBOLS

| | |
|---|---|
| 1 | Valve |
| 2 | Separating vessel, coagulation vessel |
| 3 | Insulating liquid, oil |
| 3' | Separated insulating liquid, oil |
| 4 | Electrically conducting dispersum, water, $H_2O$ |
| 5 | Settling vessel |
| 6 | Detector for the electric conductivity of S, conductivity detector |
| 7 | Frequency generator, frequency control device |
| 8,9 | Pulse generators with variable frequency |
| 10 | Sine-wave generator with variable frequency |
| 11 | Current detector, data converter |
| c | Insulating layer (ES2, ES2', ES3, ES3') of E2, E2'; E3, E3' |
| $d_c$ | Thickness of c |
| $d_s$ | Thickness of S between ES2, ES2' and ES3, ES3', distance between ES2, ES2' and ES3, ES3' |
| E1, E2, E3 | Live electrodes |
| E1', E2', E3' | Grounded counter-electrodes to E1 or E2 or E3 |
| ES2, ES3 | Insulating layers of E2 and E3 |
| ES2', ES3' | Insulating layers of E2' and E3' |
| f | Frequency |
| $f_x$ | Optimun frequency value |
| G | Generator |
| i | Current, current signal |
| S | Dispersion, suspension |
| S6 | Measuring signal at the output of 6 |
| U1 | Charging voltage, pulsating DC voltage at E1 |
| $U1_=$ | Charging DC voltage at E1 |
| U1 | Chargirg AC voltage at E1 |
| U2 | Separating voltage, pulsating DC voltage at E2 |
| U3 | Separating voltage, AC voltage at E3 or E2 |
| $\epsilon_c$ | Insulating layer dielectric constant of c |
| $\epsilon_S$ | Dispersion dielectric constant of S |
| $\epsilon_0$ | Dielectric constant of the vacuum |
| $\sigma_c$ | Electric conductivity of c |
| $\sigma_S$ | Electric conductivity of S |
| $\tau$ | Relaxation time of c |

What is claimed is:

1. A method for separating the constituents (3, 4) of a dispersion (S) having an electrically conducting dispersum (4) which is dispersed in an insulating liquid (3),
   a) this dispersion (S) being led through at least one pulsating electric field, and
   b) the dispersum (4) subsequently being separated from the insulating liquid (3), wherein
   c) the electric conductivity $\sigma_s$ of this dispersion (S) is measured continuously or discontinuously, and
   d) the frequency (f) of the pulsations of the electric field is controlled as a function of the measured conductivity $\sigma_s$ of the dispersion (S).

2. The method as claimed in claim 1, wherein the frequency (f) of the pulsations of the electric field deviates by no more than −50% and +100% from a calculated frequency value $f_x = 1/(2 \cdot \pi \cdot \tau)$ where $$\tau = \epsilon_0 \cdot (d_s \cdot \epsilon_c + d_c \cdot \epsilon_s)/(d_s \cdot \sigma_c + d_c \cdot \sigma_s),$$

$c$ = insulating layer (ES2, ES2', ES3, ES3') of electrodes (E2, E2'; E3, E3') for applying the pulsating electric field, $d_c$ = thickness of an insulating layer of $c$, $d_s$ = thickness of $S$ between these insulating layers (ES2, ES2'; ES3, ES3')

$\sigma_c, \sigma_s$ = electric conductivity of $c$ and $S$, respectively, $\epsilon_c, \epsilon_s$ = dielectric constant of $c$ and $S$, respectively, $\epsilon_0$ = dielectric constant of the vacuum.

3. The method as claimed in claim 1, wherein the pulsating electric field is a field of a bipolar electric AC voltage (U3).

4. The method as claimed in claim 1, wherein
   a) the dispersion (S) is led through two pulsating electric fields, which follow one another in their flow direction,
   b) one of the two electric fields is an electric field of a pulsating DC voltage (U2), and
   c) the other is an electric field of an AC voltage (U3).

5. The method as claimed in claim 1, wherein electrically conducting droplets (4) in the insulating liquid (3) are electrically charged in an electric field of a charging voltage (U1, U1_=, U1) of up to 5 kV before they are exposed to the at least one pulsating electric field of a pulsating separating voltage (U2, U3) for the purpose of separating the constituents (3, 4) of the dispersion (S).

6. The method as claimed in claim 1, wherein the proportion of the dispersum (4) in the dispersion (S) is ≦40%.

7. The method as claimed in claim 1, wherein the insulating liquid (3) is oil.

8. The method as claimed in claim 1, wherein the frequency (f) of the pulsations of the at least one pulsating electric field is in the frequency range of >60 Hz–1 kHz.

9. The method as claimed in claim 1, wherein the frequency (f) of the pulsations deviates by no more than ±20% from the calculated frequency value $f_x$.

* * * * *